(12) United States Patent
Mondal et al.

(10) Patent No.: US 11,100,784 B2
(45) Date of Patent: Aug. 24, 2021

(54) METHOD AND SYSTEM FOR DETECTING AND NOTIFYING ACTIONABLE EVENTS DURING SURVEILLANCE

(71) Applicant: Wipro Limited, Bangalore (IN)

(72) Inventors: Subhas Chandra Mondal, Bangalore (IN); Vishal Kumar Pandey, Tempe, AZ (US)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/808,543

(22) Filed: Mar. 4, 2020

(65) Prior Publication Data
US 2021/0201652 A1 Jul. 1, 2021

(30) Foreign Application Priority Data
Dec. 30, 2019 (IN) .............................. 201941054420

(51) Int. Cl.
*G08B 19/00* (2006.01)
*G08B 25/00* (2006.01)
(Continued)

(52) U.S. Cl.
CPC ......... *G08B 25/006* (2013.01); *G08B 29/183* (2013.01); *G16Y 40/60* (2020.01); *H04N 7/185* (2013.01)

(58) Field of Classification Search
CPC ...... H04N 7/181; H04N 5/2253; H04N 5/247; H04N 5/23229; H04N 7/188;
(Continued)

(56) References Cited

U.S. PATENT DOCUMENTS 4,338,737 A * 7/1982 Lehmann ................ G09F 3/207
40/1.5
7,847,320 B2 12/2010 Vallone et al.
(Continued)

FOREIGN PATENT DOCUMENTS

CA 2684900 A1 11/2008
CN 109484338 A 3/2019

OTHER PUBLICATIONS

Prasad, R., et al., "Technical Report M2M Enablement in Safety & Surveillance Systems TEC-TR-S&D-M2M-005-01: M2M Safety & Surveillance Working Group", Telecommunication Engineering Centre, Department of Telecommunications Ministry of Communications & Information Technology, 2015, 44 pages.
(Continued)

*Primary Examiner* — Daniel Previl
(74) *Attorney, Agent, or Firm* — Finnegan, Henderson, Farabow, Garrett & Dunner, LLP

(57) ABSTRACT

The disclosure relates to method and system for detecting and notifying actionable events during surveillance. The method may include receiving initial multi-modal inputs from a geo-location during surveillance, determining an incident of interest based on an analysis of the initial multi-modal inputs, and collecting additional multi-modal inputs from at least one access device corresponding to at least one person in the geo-location upon determination of the incident of interest. The method may further include determining the actionable event based on an analysis of the initial and the additional multi-modal inputs, and providing a notification of the actionable event to one or more appropriate authorities.

18 Claims, 12 Drawing Sheets

(51) Int. Cl.
*G08B 29/18* (2006.01)
*H04N 7/18* (2006.01)
*G16Y 40/60* (2020.01)

(58) Field of Classification Search
CPC ...... H04N 5/2252; H04N 5/77; H04N 9/8205; H04N 5/2628; H04N 5/2251; H04N 5/2254; H04N 5/2257; H04N 5/28; H04N 5/772; H04N 5/907; H04N 7/18; G06K 9/00771; G06K 9/00711; G06K 9/00791; G06K 2009/00738; G06K 9/00369; G06K 9/325; G06K 9/6277; G06K 9/00744; G06K 9/00845; G06T 2207/10016; G06T 2207/30232; G06T 2207/30196; G06T 7/246; G06T 7/292; G06T 2207/30252; G06T 7/73; G06T 17/05; G06T 2207/30244; G06T 7/248; G06T 7/70; G08B 25/016; G08B 13/19608; G08B 21/12; G08B 13/19613; G08B 13/19647; G08B 13/19695; G08B 21/182; G08B 13/19626; G08B 13/1963; G08B 13/19673; G08B 29/188; G08B 13/19621; G08B 13/19676; G08B 25/001; G08B 6/00; H04Q 9/00; H04Q 2209/823; H04Q 2209/50; G06F 3/04842; G06F 16/24568; G06F 16/29; G06F 16/7867; G06F 16/951; G06F 3/04847; G01D 1/18; G01D 9/28; G01R 29/0857; G01T 1/24; G01T 1/247; G01T 7/00; G06Q 50/265; G06Q 10/00; G06Q 10/02; G06Q 50/26; G10L 15/25; G10L 17/26; B60R 1/04; B60R 1/12; B60R 2001/1253; F41C 33/029; G11B 27/10; G11B 27/36; H04L 41/22; H04L 63/302; H04L 67/18; H04W 4/021; H04W 4/70

USPC ........... 340/521, 903, 426.1, 426.26, 539.11, 340/539.22, 539.13, 539.32, 568.1, 340/636.17, 691.6

See application file for complete search history.

(56) References Cited

U.S. PATENT DOCUMENTS

| | | | |
|---|---|---|---|
| 7,942,314 B1* | 5/2011 | Grimm | G06Q 20/10 235/379 |
| 8,054,168 B2 | 11/2011 | McCormick et al. | |
| 8,302,856 B1* | 11/2012 | Grimm | G06Q 40/02 235/379 |
| 9,208,665 B2 | 12/2015 | Jackson | |
| 9,491,277 B2 | 11/2016 | Vincent | |
| 9,734,702 B2 | 8/2017 | Rabb et al. | |
| 2006/0028556 A1* | 2/2006 | Bunn | G10L 15/25 348/211.99 |
| 2015/0338447 A1* | 11/2015 | Gallo | G01T 1/247 340/600 |
| 2016/0286156 A1* | 9/2016 | Kovac | H04N 5/28 |
| 2018/0300557 A1 | 10/2018 | Rodenas et al. | |
| 2018/0354443 A1* | 12/2018 | Ebrahimi | B60N 2/2812 |

OTHER PUBLICATIONS

Thompson, C., et al., "Using Smartphones to Detect Car Accidents and Provide Situational Awareness to Emergency Responders", LNICST 48, 2010, 14 pages.

* cited by examiner

METHOD AND SYSTEM FOR DETECTING AND NOTIFYING ACTIONABLE EVENTS DURING SURVEILLANCE

TECHNICAL FIELD

This disclosure relates generally to surveillance, and more particularly to method and system for detecting and notifying actionable events during surveillance.

BACKGROUND

Thousands of individuals experience serious, unexpected emergency situations every day, where they may require assistance. Throughout the world, many rescue authorities are available for providing assistance in such situation to the person in need. However, many a times, individuals requiring such assistance may not be in a condition to seek assistance. For example, they may not have time or ability to respond to such emergencies due to unfavorable circumstances. Such circumstances may involve limitations of body movement, panic after an accident or any other hostile condition. Further, such circumstances may lead to irreparable damage (e.g., permanent disability, death, etc.), if not given timely and appropriate assistance. Sometimes, even if an individual, is somehow able to initiate the need for assistance, taking an appropriate action is almost impossible due to unavailability of the details of the emergency.

There are many conventional techniques for triggering and providing assistance to individuals in emergencies. However, such techniques are prone to false initiation and fail to detect the severity of the situation. Further, only initiation for the assistance by the individual may not be enough. Conventional techniques lack the ability to effectivity capture details, if any, in order to identify the type of emergency and condition of the individual in a specific situation and to detect seriousness of the situation. As will be appreciated, such details are needed to provide appropriate remedial response to the individual in need.

SUMMARY

In one embodiment, a method for detecting and notifying an actionable event during surveillance is disclosed. In one example, the method may include receiving initial multi-modal inputs from a geo-location during surveillance. The method may further include determining an incident of interest based on an analysis of the initial multi-modal inputs. The method may further include collecting additional multi-modal inputs from at least one access device corresponding to at least one person in the geo-location upon determination of the incident of interest. The method may further include determining the actionable event based on an analysis of the initial and the additional multi-modal inputs. The method may further include providing a notification of the actionable event to one or more appropriate authorities.

In another embodiment, a system for detecting and notifying an actionable event during surveillance is disclosed. In one example, the system may include a processor and a memory communicatively coupled to the processor, wherein the memory stores processor-executable instructions, which, on execution, may cause the processor to receive initial multi-modal inputs from a geo-location during surveillance. The processor-executable instructions, on execution, may further cause the processor to determine an incident of interest based on an analysis of the initial multi-modal inputs. The processor-executable instructions, on execution, may further cause the processor to collect additional multi-modal inputs from at least one access device corresponding to at least one person in the geo-location upon determination of the incident of interest. The processor-executable instructions, on execution, may further cause the processor to determine the actionable event based on an analysis of the initial and the additional multi-modal inputs. The processor-executable instructions, on execution, may further cause the processor to provide a notification of the actionable event to one or more appropriate authorities.

In yet another embodiment, a non-transitory computer-readable storage medium, storing computer-executable instructions for detecting and notifying an actionable event during surveillance, is disclosed. The stored instructions, when executed by a processor, may cause the processor to perform operations including receiving initial multi-modal inputs from a geo-location during surveillance. The operations may further include determining an incident of interest based on an analysis of the initial multi-modal inputs. The operations may further include collecting additional multi-modal inputs from at least one access device corresponding to at least one person in the geo-location upon determination of the incident of interest. The operations may further include determining the actionable event based on an analysis of the initial and the additional multi-modal inputs. The operations may further include providing a notification of the actionable event to one or more appropriate authorities.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
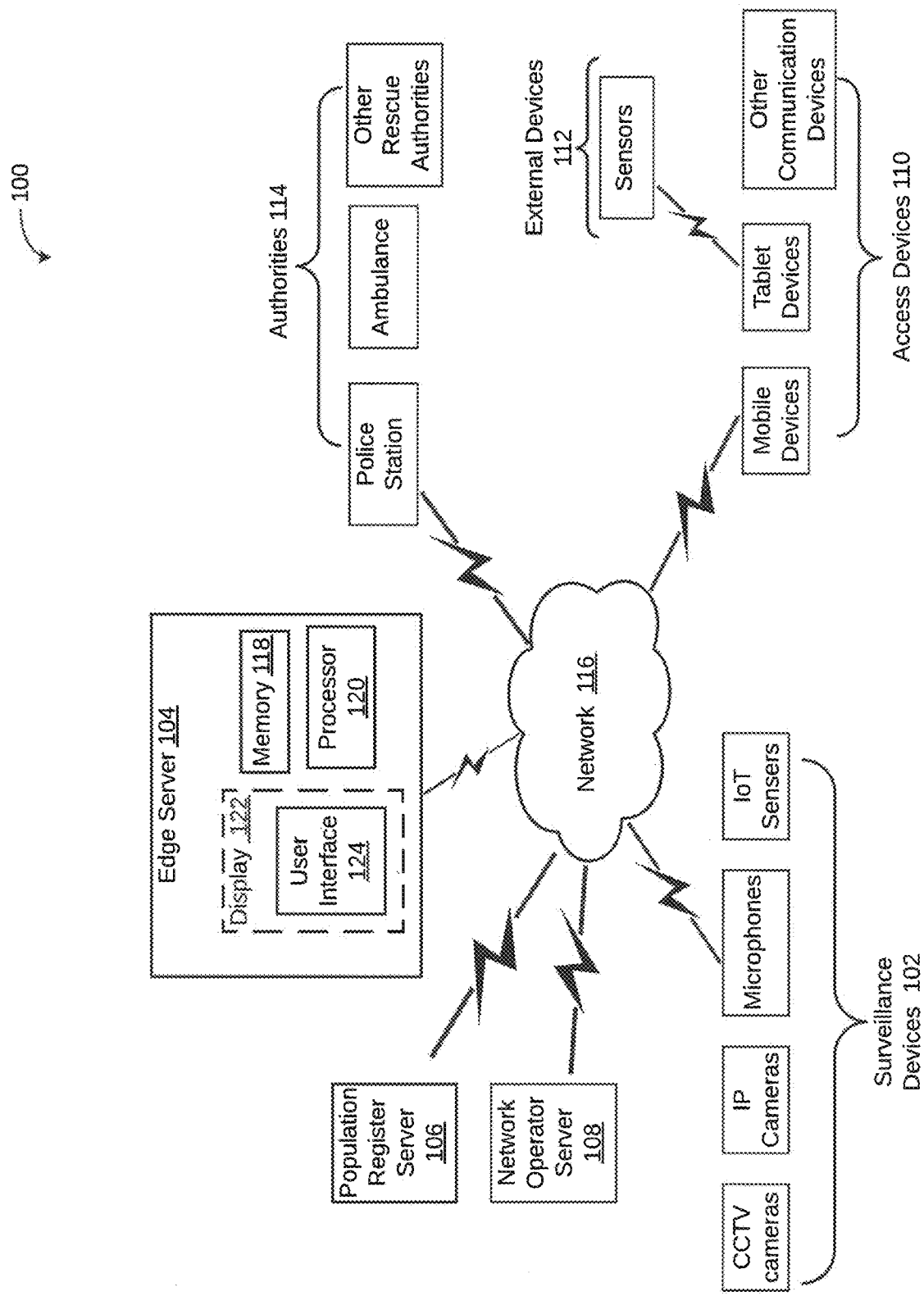
FIG. 1 is a block diagram of an exemplary system for detecting and notifying actionable events during surveillance, in accordance with some embodiments of the present disclosure.

Referring now to FIG. 1, an exemplary system 100 for detecting and notifying actionable events during surveillance is illustrated, in accordance with some embodiments of the present disclosure. The system 100 may include surveillance devices 102, an edge server 104, a population register 106, a network operator server 108, access devices 110, external devices 112, and authorities 114 communicatively coupled to each other via a network 116. The network 116 may be a wired or a wireless network and the examples may include, but are not limited to, Internet, Wireless Local Area Network (WLAN/Wi-Fi), Wireless CDMA (WCDMA), Long Term Evolution (LTE), 5G-NR, LiFi, Worldwide Interoperability for Microwave Access (WiMAX), and General Packet Radio Service (GPRS).

The surveillance devices 102 may be responsible for continuously capturing initial multi-modal inputs and sharing the same with the edge server 104. In some embodiments, the surveillance device 102 may perform primary processing the initial multi-modal inputs and then share the initial multi-modal inputs as well as result of the primary processing with the edge server 104. It should be noted that the surveillance devices 102 may include public surveillance devices as well as personal devices (e.g., mobile access devices, fitness tracking devices, health monitoring devices, user devices, etc.). By way of an example, the surveillance devices 102 may include, but are not limited to, closed-circuit television (CCTV) camera, Internet Protocol (IP) camera, microphone, Internet-of-Things (IoT) sensor, mobile device, hand-held device, and wearable device.

In some embodiment, the initial multi-modal inputs correspond to a continuously shared live feed or readings from the surveillance devices 102. In some embodiments, the initial multi-modal inputs may include, but are not limited to, speech, image, video, notification (e.g., SOS notification) from personal access device, and sensor reading (e.g., heart rate, GPS readings, etc.) from personal access/wearable device. By way of an example, the initial multi-modal inputs may be a feed from public CCTV camera showing a damaged vehicle and injured and/or unconscious persons. By way of another example, the initial multi-modal inputs may be a feed from the public CCTV camera device showing a person running away from two people in a street, a SOS notification received from a user device (in possession of the person running away) along with a trigger for the SOS notification (e.g., increased heart rate (probably due to panicked running) recorded by a fitness tracker of the person running away). As will be appreciated, the initial multi-modal inputs may come with or may include geo-location information of the initial multi-modal inputs. For example, the CCTV camera feed may come from the CCTV camera installed at a particular location. Similarly, the feed from hand-held device or wearable device may come along with the GPS location.

The edge server 104 may analyze the initial multi-modal inputs for identifying an incident of interest. The incident of interest may include, but is not limited to, an accident, a crime, a riot, and a natural disaster. By way of an example, the edge server 104 may analyse the camera feed showing the damaged vehicle and injured and/or unconscious persons to identify an accident or a probable accident. By way of another example, the edge server 104 may analyse the camera feed showing the person running away along with SOS notification to identify a probable crime. Upon determination of the incident of interest, the edge server 104 may proceed to collect additional information with respect to the incident of interest. In particular, the edge server 104 may collect additional multi-modal inputs from at least one access device corresponding to at least one person in the geo-location upon determination of the incident of interest.

In some embodiments, the edge server 104 may identify persons present in the geo-location of the incident of interest. It should be noted that the identification may be carried for the persons in need (e.g., accident victims, crime victims, etc.) as well as any persons around the persons in need (e.g., people present at the accident/crime scene, the criminals, etc.). The edge server 104 may communicate with the population register server 106 via network 116 in order to identify the persons. The edge server 104 may perform at least one of a facial recognition of faces or a voice recognition of voices in the multi-modal inputs against that of a number of persons in a population register server 106. The population register server 106 may include identity information (name, photo, contact number, etc.) of the population. The population register server 106 may include, but is not limited to, a Unique Identification Authority of India (UIDAI) server comprising Aadhaar registration details of the population and a social security server comprising social security registration details of the population. In some embodiments, the population register server 106 may also include biometric information (voice sample, iris scan, fingerprints, etc.), health information (blood group, presence of a health condition (e.g., diabetes, hypertension, etc.), allergy information, etc.) emergency information (e.g., emergency contact persons and contact numbers, insurance number, etc.).

Upon identifying the persons, the edge server 104 may further coordinate with the network operator server 108 to validate the geo-location of retrieved contact information associated with the identified persons with the geo-location of incident of interest. In some embodiments, the network operator server 108 may correspond to wired or wireless communication services provider that owns the infrastructure necessary to sell and deliver services to mobile network operators (MO), virtual network operators, and end users. The edge server 104 may activate an access device 110 corresponding to a user from among the identified persons present in the geo-location of incident of interest. In some embodiments, activation of the access device 110 may be associated with remote activation of emergency application that reside on the access device 110. It should be noted that the activation of the access device 110 may be automatic or manual. The automatic activation may be either in stealth mode (i.e., without notifying the user) or in non-stealth mode (i.e., with a notification to the user). In non-stealth mode, the user may be able to disable the activation, if desired. The manual activation may be upon proactive action by the user (i.e., with a permission of the user). Further, it should be noted that, in some embodiments, the user may be able to pre-set preferred activation modes through the emergency application that reside on the access device 110. By way of an example, the access devices 110 may include, but are not limited to, mobile device, tablet device, wearable device, and any other communication device. The access devices 110 on activation may capture additional multi-modal inputs either through in-built sensors or through sensors residing on one or more external devices 112 in communication with the activated access device 110. The access devices 110 may then share the captured additional multi-modal inputs with the edge server 104. By way of an example, the external devices 112 may include, but are not limited to, camera, voice recorder, fitness tracker, and health monitoring system.

The edge server 104, may then determine a correlation between the initial-multi model inputs and the additional multi-modal inputs for validating the incident of interest. For example, the validation may include, but is not limited to, a validation of a geo-location extracted from the initial multi-modal inputs with respect to a geo-location received extracted from the additional multi-modal inputs. Thereafter, the edge server 104 may analyze both the initial and the additional multi-modal inputs, in order to determine an actionable event. The actionable event may include, but is not limited to, an injured person in road accident, a person in endangered situation, and a fire emergency. It should be noted that the incident of interest is an incident that should be further looked into for determining actionable event, while the actionable event is a specific event that requires a remedial response. By way of an example, the edge server 104 may analyse the camera feed showing the damaged vehicle and injured and/or unconscious persons as well the additional multi-modal inputs collected from the access device to identify the injured persons, a type and a severity of injuries in each of the identified injured persons, their respective blood groups, their vital health parameters, and so forth. By way of another example, the edge server 104 may analyse the camera feed showing the person running away along with SOS notification as well the additional multi-modal inputs collected from the access device to identify the victim and the criminals, recorded crime history of the identified criminals, and so forth.

The edge server 104 may then notify about the actionable event to one or more appropriate authorities 114. By way of example, the notification may be an intimation of the accident/crime at a particular geo-location. Additionally, in some embodiments, the edge server 104 may also provide a recommendation (e.g., keep two units B+ blood, etc.) along with notification about the actionable event (e.g., an accident involving an injured person with excessive bleeding) to the one or more appropriate authorities 114. The one or more appropriate authorities may include, but are not limited to, nearby police station, nearby hospital, and nearby fire station. In some embodiments, the notification about the actionable event may be in form of or along with a synopsis or a summary of a story. By way of example, the story summary may be that "A car accident on Highway 07 at about 5 KM from Toll Plaza 3. Two injured persons. One with minor external injuries, but unconscious. The other with excessive bleeding (B+ blood group) and unconscious." By way of another example, the story summary may be that "A person is being chased by two history-sheeters (Ranga and Billa) on Street No. 5 off the Saint Mark's Street."

The edge server 104 may include a memory 118 and a processor 120. The memory 118 may store the initial and the additional multi-modal inputs. The memory may also store instructions, which when executed by the processor 120, causes the processor 120 to analyse the initial and the additional multi-modal inputs to detect any actionable events, to determine suitable recommendations, to notify the actionable events to the authorities 114, and so forth. The memory 118 may be a non-volatile memory or a volatile memory. Examples of non-volatile memory, may include, but are not limited to flash memory, Read Only Memory (ROM), Programmable ROM (PROM), Erasable PROM (EPROM), and Electrically EPROM (EEPROM) memory. Examples of volatile memory may include, but are not limited to, Dynamic Random Access Memory (DRAM), and Static Random-Access memory (SRAM). Further, the edge server may include a display 122 that may render a user interface 124. A user or an administrator may interact with the edge server 104 and vice versa through the user interface 124. The user interface 124 may be used to display multi-modal inputs received from the surveillance devices 102 and/or the access devices 110. The user interface 124 may be used to provide further multi-modal inputs to the edge server device 104. Such further multi-modal inputs may be inputs by the user based on a manual assessment of the initial/additional multi-modal inputs received from the surveillance/access devices. Such further multi-modal inputs may be in form of voice or text.

Figure 2:
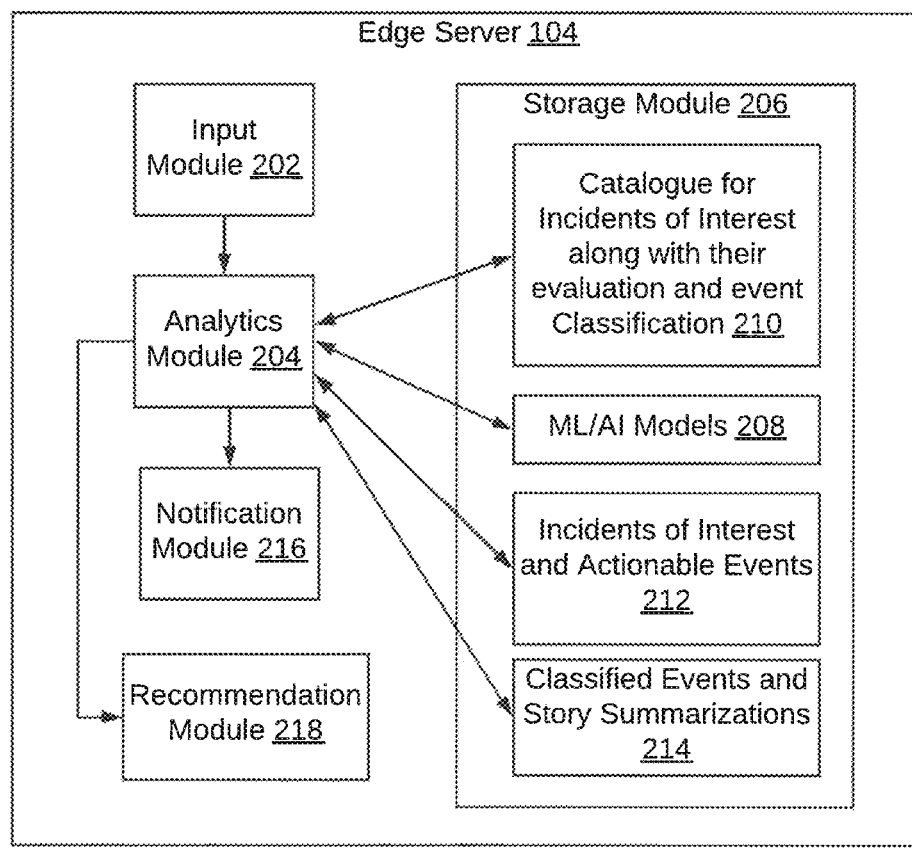
FIG. 2 illustrates a functional block diagram of an exemplary edge server for detecting and notifying actionable events during surveillance, in accordance with some embodiments of the present disclosure.

Referring now to FIG. 2, a functional block diagram of an edge server 104 for detecting and notifying an actionable event during surveillance is illustrated, in accordance with an embodiment. The edge server 104 may include an input module 202, an analytics module 204, a storage module 206, a notification module 216 and a recommendation module 218. The input module 202 may receive initial and additional multi-modal inputs received from the plurality of surveillance devices 102 and the plurality of access device 110 respectively. The input module 202 may then share these initial multi-modal inputs and additional multi-modal inputs as an input data with the analytics module 204. The analytics module 204 may then analyze the input data received from the input module 202 to determine an incident of interest and a actionable event. Further, for analyzing the input data received, the analytics module 204 may communicate with the storage module 206.

The storage module 206 may further include machine learning (ML) or artificial intelligence (AI) models 208, a catalogue for incidents of interest (along with their evaluation and event classification) 210, incidents of interest and actionable events 212, and classified events and corresponding story summarizations 214. The analytics module 204 may employ a suitable ML/AI model 208 for identifying and classifying a new incident of interest based on the input data received. By way of an example, the ML/AI models 208 may be trained based on training dataset comprising a number of incidents of interest. For example, a Convolutional Neural Network (CNN) based AI model may be trained on a large number of labelled data that may include incidents of interest from different scenes so as to identify the incident of interest for any real-time scene and to classify the identified incident of interest. Thereafter, when a new incident of interest is received, the CNN based AI model may identify and classify the new incident of interest based on the learning. Upon identification and classification of the incident of interest, the analytics module 204 may employ a suitable ML/AI model 208 for determining an actionable event based on the input data received. The analytics module 204 may also prepare a story based on the incident of interest and the actionable event, based on classification of the incident of interest and information stored in the catalogue of incidents of interest 210 (e.g., evaluation and classification of similar past incidents event). In some embodiments, the catalogue for incidents of interest 210 may be stored in form of a knowledge graph, which may be referred for decision making while evaluating a new incident of interest, in reference to a discrete data available. The discrete data may correspond to the input data which may include the initial multi-modal inputs and additional multi-modal inputs. Once the story of the incident is prepared, the analytics module 204 may perform further analysis in order to classify the actionable event, based on seriousness and criticality of the incident of interest. The seriousness and criticality of the incident of interest may be determined based on information stored in the incidents of interest and actionable events 212, and the classified events and corresponding story summarizations 214. Moreover, information stored in the incidents of interest and actionable events 212 and the classified events and corresponding story summarizations 214 may include confidence scores associated with incidents of interest and with actionable events. Thereafter, upon determining seriousness and criticality of the actionable event, the analytics module 204 may communicate with the notification module 216 for providing a notification about the actionable event, to one or more appropriate authorities 114. Additionally, the analytics module may also provide a recommendation from the recommendation module 218 when notifying one or more appropriate authorities 114 about the actionable event.

Figure 3A:
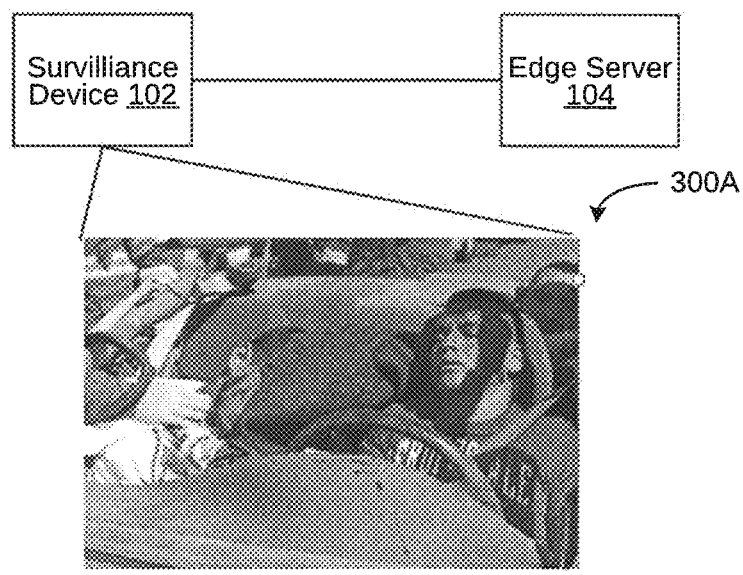
FIGS. 3A and 3B illustrate detection and evaluation of an exemplary incident of interest and generation of an associated knowledge graph, in accordance with some embodiments of the present disclosure.
Figure 3B:
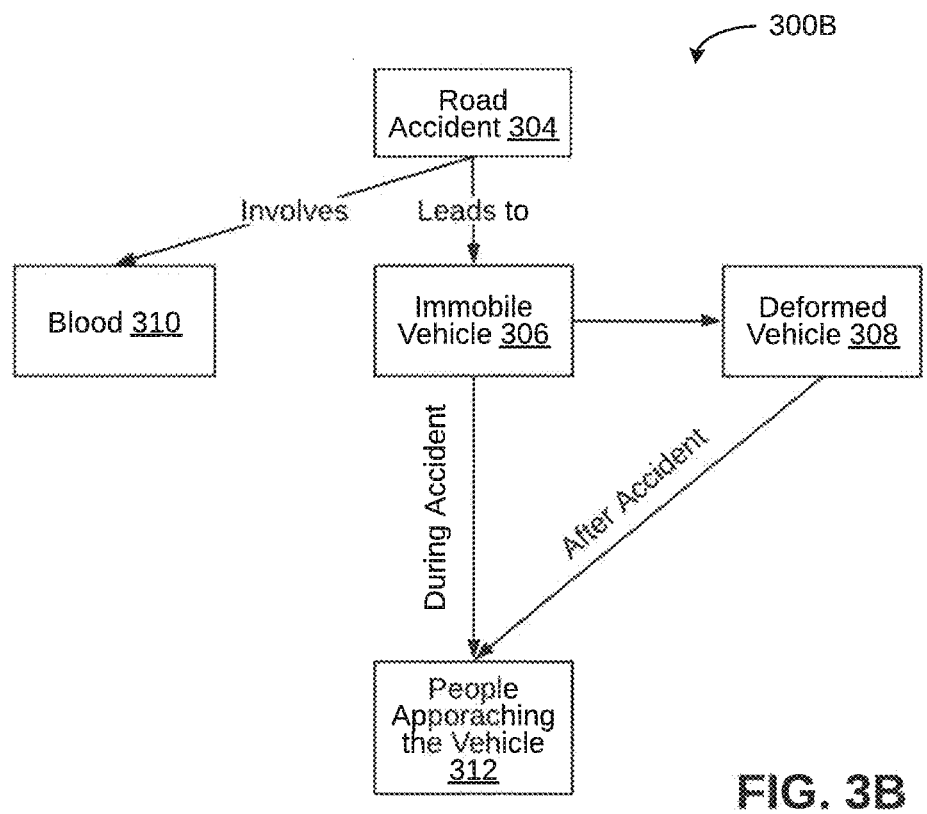

Referring now to FIGS. 3A and 3B, detection and evaluation of an exemplary incident of interest and generation of an associated knowledge graph is illustrated, in accordance with some embodiments of the present disclosure. Referring now to FIG. 3A, a situation 300A is captured and assessed to determine the incident of interest 302, in accordance with an embodiment. One or more surveillance devices 102 may continuously capture and share multi-modal inputs with the edge server 104. The edge server 104 may then use ML/AI models 208 for identifying the incident of interest 302 by analyzing the captured multi-modal inputs. In the illustrated embodiment, the incident of interest 302 may include a road accident. By way of an example, the initial multi-modal inputs may include, but are not limited to, collision data from vehicle or public CCTV camera, control failure data from vehicle, and clear image of vehicle and driver from public CCTV camera. As will be appreciated, the occurrence of the incident of interest 302 with a particular relationship with each other or with past or future states may construe a meaningful insight that qualifies to be a reason for triggering information sharing with the authorities (e.g., safety agencies). For example, if a vehicle is detected to be stationary and deformed along with people rushing towards the vehicle, it may be an indication of an accident. When correlated with a state of the vehicle being in motion just before this set of events, the confidence level of considering this situation as a case of accident will get better. The edge server 104 may then perform identification of persons in a geo-location of the incident of interest 302 by performing at least one of a facial recognition of faces or a voice recognition of voices. The edge server 104 may then determine the access devices 110 belonging to the identified persons in the geo-location of the incident of interest 302 so as to trigger gathering of additional information.

Once the contact information is retrieved, the edge server 104 may identify correlation between a geo-location extracted from the initial multi-modal inputs and a geo-location of the access devices, corresponding to the retrieved contact information of the persons, so as to further validate the incident of interest 302. The edge server 104 may also remotely enable at least one access device 110 to collect additional multi-modal inputs with respect to the incident of interest 302. For example, the additional multi-modal inputs may be people talking about injured and unconscious people inside the vehicle. The edge server 104 may then perform analysis based on the initial and the additional multi-modal inputs, in order to identify an actionable event. For example, the actionable event may be that the two injured and unconscious persons are present inside the vehicle with a lot of blood loss. Thereafter, based on analysis of the initial and the additional multi-modal inputs, the edge server 104 may provide a notification of the actionable event along with a recommendation to one or more appropriate authorities 114 so that they may take remedial action. By way of an example, a notification may be 'road accident involving two injured and unconscious people with a lot of blood loss', the recommendation may be 'rush police response team and an ambulance to <the geo-location of the incident of interest>', and the authorities may be nearby police stations and nearby hospitals.

Referring now to FIG. 3B, a knowledge graph 300B representing the learning from the situation 300A is illustrated, in accordance with an embodiment. In the illustrated embodiment, an incident of interest such as the road accident 304 may lead to an immobile vehicle 306 and probably a deformed vehicle 308. The road accident 304 may also involve blood 310 of injured people involved in the accident. Additionally, once the vehicle has become immobile and/or deformed, the road accident 304 may involve people approaching towards the immobile and/or deformed vehicle 312 during and/or after the accident.

Figure 4A:
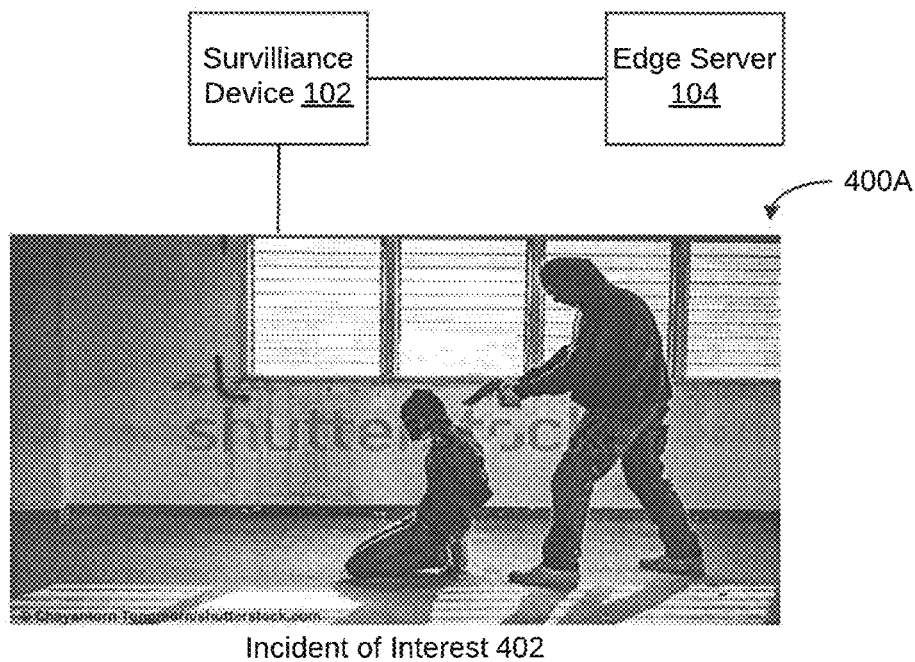
FIGS. 4A, 4B, and 4C illustrate detection and evaluation of another exemplary incident of interest and generation of an associated knowledge graph, in accordance with some embodiments of the present disclosure.
Figure 4B:
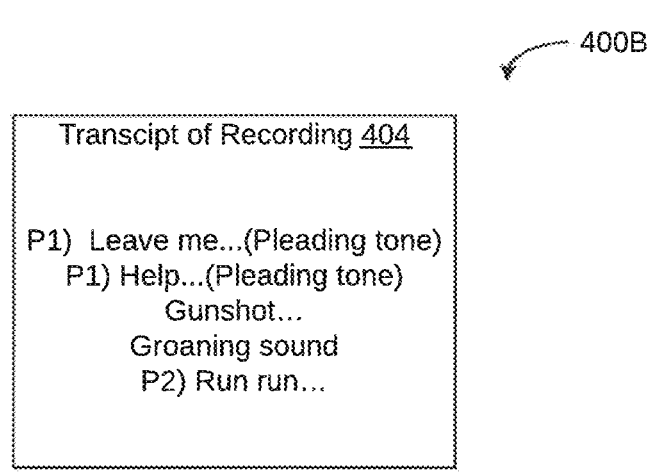
Figure 4C:
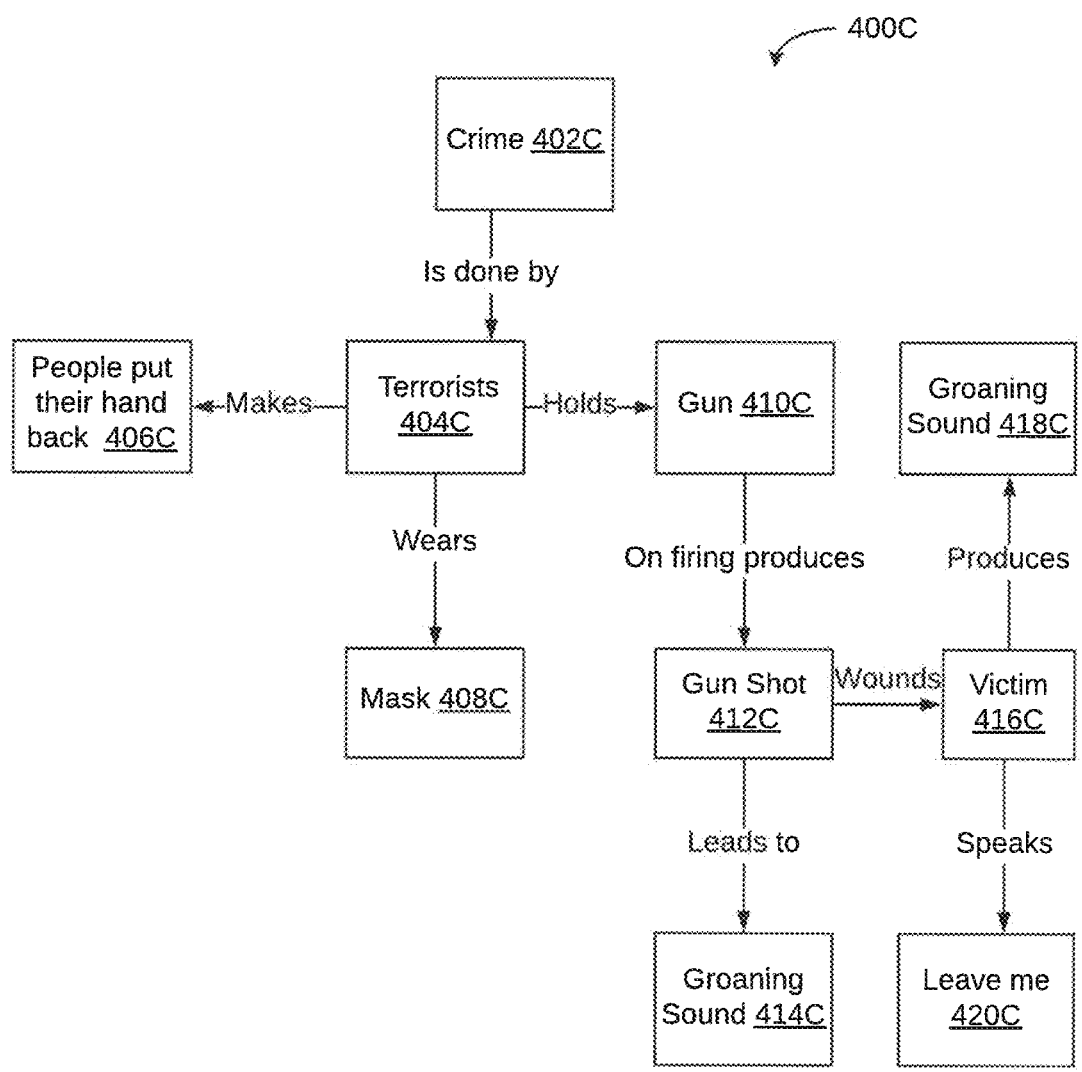

Referring now to FIGS. 4A, 4B and 4C detection and evaluation of another exemplary incident of interest and generation of an associated knowledge graph is illustrated, in accordance with some embodiments of the present disclosure. Referring now to FIG. 4A, a situation 400A is captured and assessed to determine the incident of interest 402, in accordance with an embodiment. One or more surveillance devices 102 may continuously capture and share multi-modal input along with geo-location, with the edge server 104. The edge server 104 may then use ML/AI models 208 for identifying the incident of interest 402 by analyzing the captured multi-modal inputs. In the illustrated embodiment, the incident of interest 402 may include a crime. By way of an example, the initial multi-modal inputs may include, but are not limited to, images/voices captured at crime scene from public CCTV camera/microphone (e.g., pointed weapon, panic in voice, gun shot, etc.). The edge server 104 may then perform identification of persons in a geo-location of the incident of interest 402 by performing at least one of a facial recognition of faces or a voice recognition of voices. The edge server 104 may then determine the access devices 110 belonging to the identified persons in the geo-location of the incident of interest 402 so as to trigger gathering of additional information.

Once the contact information is retrieved, the edge server 104 may identify correlation between a geo-location extracted from the initial multi-modal inputs and a geo-location of the access devices, corresponding to the retrieved contact information of the persons, so as to further validate the incident of interest 402. The edge server 104 may also remotely enable at least one access device 110 to collect additional multi-modal inputs with respect to the incident of interest 402. For example, the additional multi-modal inputs may be voice recording of terrorist threatening the hostages. It should be noted that such collection of additional multi-modal inputs may preferably be performed in stealth mode. Referring now to FIG. 4B, a transcript of the captured voice recording 404 is provided, in accordance with an embodiment. In the illustrated embodiment, the transcript of the captured voice recording may include, but is not limited to, "leave me", "help", a pleading tone, a gunshot, and a groaning sound. The edge server 104 may then perform analysis based on the initial and the additional multi-modal inputs, in order to identify an actionable event. For example, the actionable event may be that a person is highly endangered. Thereafter, based on analysis of the initial and the additional multi-modal inputs, the edge server 104 may provide a notification of the actionable event along with a recommendation to one or more appropriate authorities 114.

Referring now to FIG. 4C, a knowledge graph 400C representing the learning from the situation 400A is illustrated, in accordance with an embodiment. In the illustrated embodiment, an incident of interest such as the road accident 402C involves a terrorist 404C. The terrorist 404C makes people put their hands at the back 406C. The terrorist 404C wears a mask 408C and holds a gun 410C which on firing produces a gunshot sound 412C. The gun shot 412C may lead to a groaning sound 414C and may wound a victim 416C. The wounded victim 416C may speak "leave me" 420C, while making a groaning sound 418C.

Figure 5:
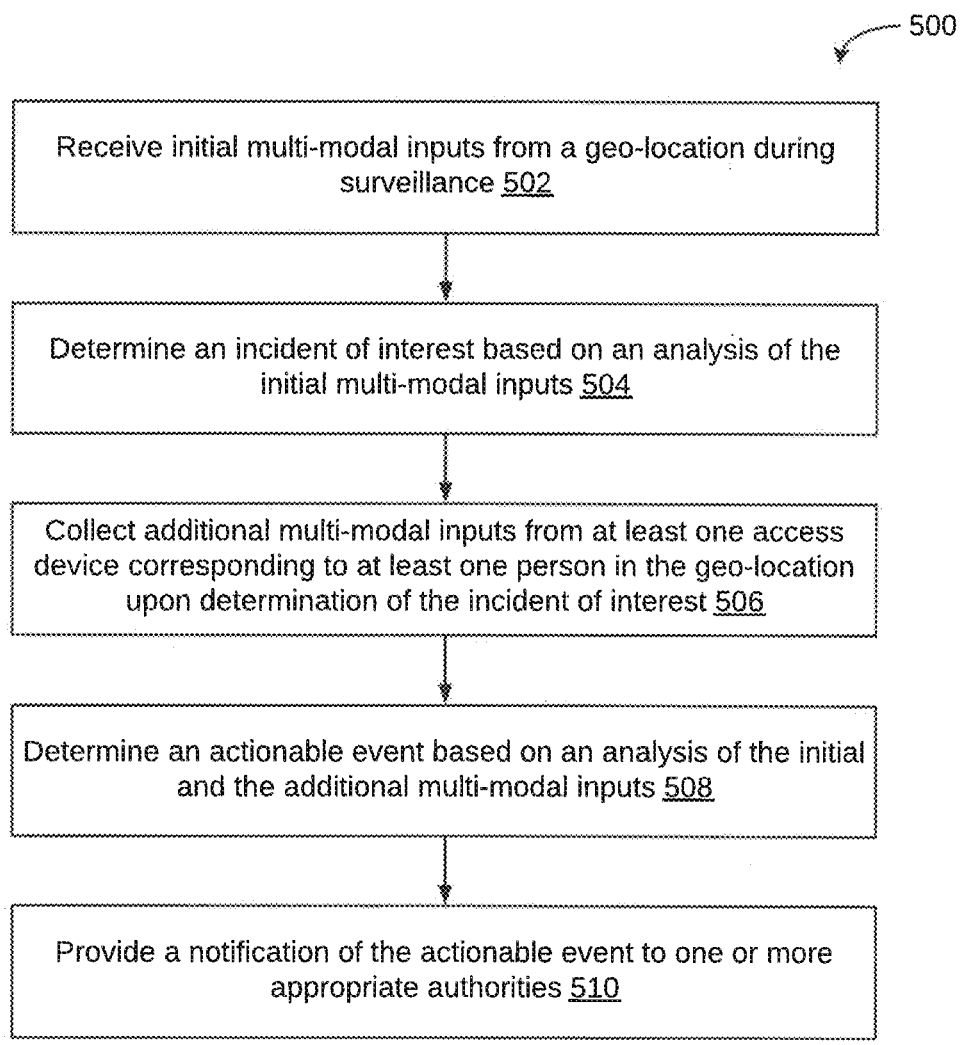
FIG. 5 is a flow diagram of an exemplary process for detecting and notifying actionable events during surveillance, in accordance with some embodiments of the present disclosure.

Referring now to FIG. 5, an exemplary control logic 500 for detecting and notifying actionable events during surveillance is depicted via a flowchart, in accordance with some embodiment of the present disclosure. At step 502, initial multi-modal inputs may be received from the plurality of surveillance devices 102. The initial multi-modal inputs may correspond to a captured live feed during surveillance. By way of an example, the initial multi-modal inputs may include, but are not limited to, speech, image, video, notification from device, and sensor reading (e.g., heart rate, GPS readings, etc.) from device. At step 504, an incident of interest and a geo-location of incident of interest is determined based on the analysis of initial multi-modal inputs. By way of an example, the incident of interest may include, but is not limited to, an accident, a crime, a riot, and a natural disaster. At step 506, additional multi-modal inputs may be collected from at least one access device corresponding to at least one person in the geo location of incident of interest. The additional multi-modal inputs may be collected by enabling an emergency application installed in at least one access device corresponding to at least one person in the geo location of incident of interest. By way of an example, the additional multi-modal inputs may include, but are not limited to, voice of the identified persons, video-recording of the surrounding, and monitored sensor parameters. As will be appreciated, the additional multi-modal inputs may provide a detailed information with respect to the incident of interest (e.g., how accident happened, a nature of injury, amount of blood loss, etc.), a personal information with respect to the person involved (blood group, emergency contact number, etc.), and so forth.

At step 508, the initial and additional multi-modal inputs are analyzed for determining an actionable event. In an embodiment, the actionable event may correspond to any emergency situation that requires assistance. By way of an example, the actionable event may include, but is not limited to, an injured person in road accident, a person in endangered situation, and a fire emergency. At step 510, a notification about the actionable event identified is provided to one or more appropriate authorities. The notification may further be followed with a recommendation with respect to the actionable event, to one or more authorities. By way of an example, one or more authorities may include but are not limited to, nearby police station, nearby hospital, and nearby fire station. The notification may also be sent to friends and families when such information is available.

Figure 6:
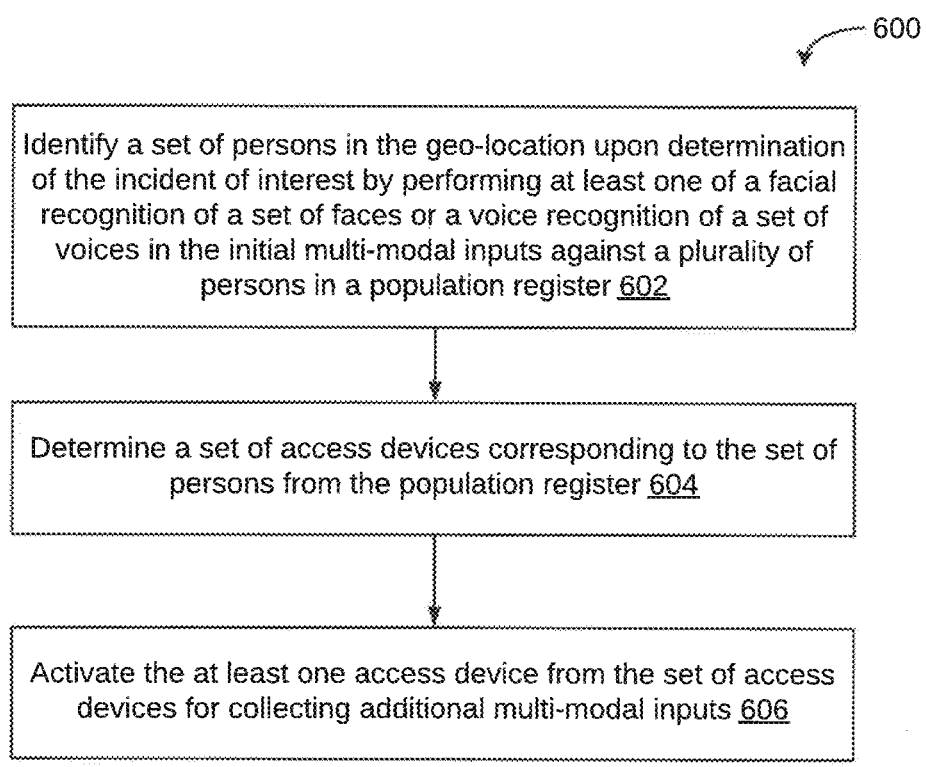
FIG. 6 is a flow diagram of an exemplary process for identifying persons present in a geo-location of an incident of interest, in accordance with some embodiments of the present disclosure.

Referring now to FIG. 6, an exemplary control logic 600 for identifying persons present in a geo-location of an incident of interest is depicted via a flowchart, in accordance with some embodiment of the present disclosure. At step 602, a set of persons may be identified in the geo-location of incident of interest by performing at least one of a facial recognition of a set of faces or a voice recognition of a set of voices in the multi-modal input against a plurality of person in an identity database. By way of an example, the identity database may include, but is not limited to, a UIDAI database and a social security database. Once the set of persons is identified, at step 604, a set of access devices is identified corresponding to the set of persons present in a geo-location of the incident of interest. By way of an example, the access devices may include, but are not limited to, mobile device, tablet device, wearable device, and any other communication device. Once the plurality of access devices are identified, at step 606, the plurality of access devices may be activated, in order to collect additional multi-modal inputs.

Figure 7:
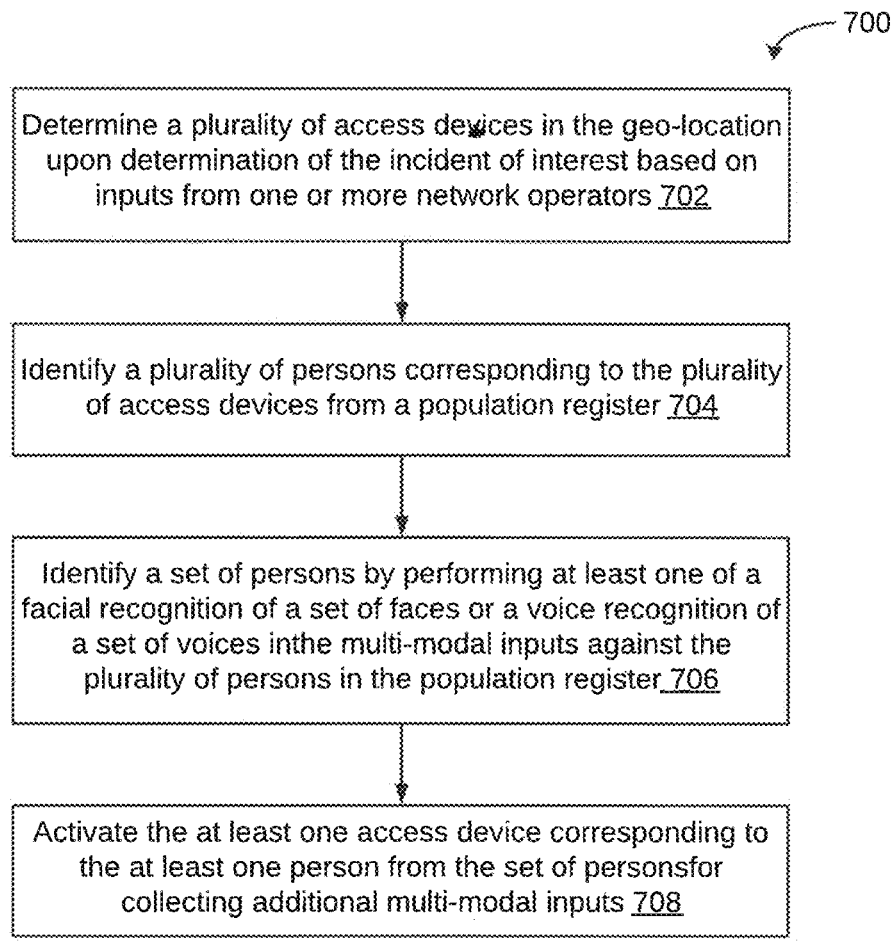
FIG. 7 is another flow diagram of an exemplary process for identifying persons present in a geo-location of an incident of interest, in accordance with some embodiments of the present disclosure.

Referring now to FIG. 7, another exemplary control logic 700 for identifying persons present in the geo-location of the incident of interest is depicted via a flowchart, in accordance with some embodiment of the present disclosure. At step 702, a plurality of access devices present in the geo-location of the incident of interest are determined, based on inputs from one or more network, operators. The network operators may correspond to wired or wireless communication service providers that own the infrastructure necessary to sell and deliver services to mobile network operators (MO), virtual network operators, and end users. At step 704, a plurality of persons corresponding to the plurality of access devices are identified from the population register. At step 706, a set of persons present at the exact place of incident of interest are identified from among the plurality of persons identified at step 704. The identification at step 706 may be performed by performing at least one of a facial recognition of a set of faces or a voice recognition of a set of voices in the multi-modal inputs against the plurality of persons identified at step 704. As will be appreciated, this may substantially reduce the computing resource and time required as against identifying the set of persons against a larger population. At step 708, at least one access device corresponding to at least one person from the set of persons is activated by a remote trigger. The at least one activated access device may then collect additional multi-modal inputs.

Figure 8:
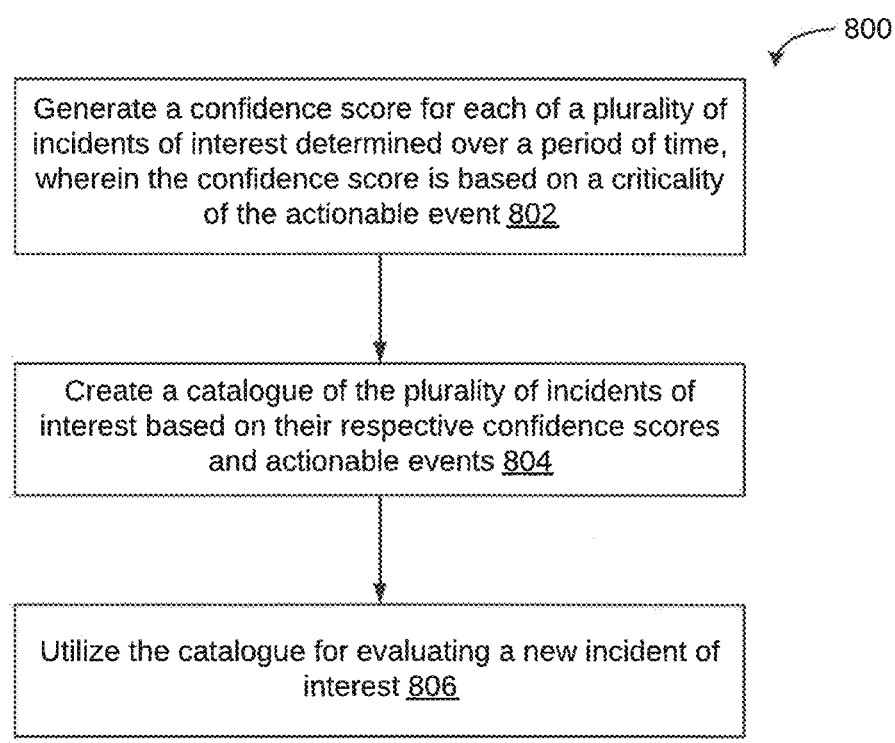
FIG. 8 is a flow diagram of an exemplary process for generating a catalogue of incidents of interest for subsequent evaluation of new incidents of interest, in accordance with some embodiments of the present disclosure.

Referring now to FIG. 8, an exemplary control logic 800 for generating a catalogue for incidents of interest for subsequent evaluation of new incidents of interest is depicted via a flowchart, in accordance with some embodiment of the present disclosure. At step 802, a confidence score is generated for each of a plurality of incidents of interest determined over a period of time, based on a criticality of the actionable event. By way of an example, the critical actionable event may correspond with any event that is crucial, dangerous, and risky. Once the confidence score is generated, at step 804, a catalogue is created based on confidence score associated to the plurality of incidents of interest and the actionable events. At step 806, the catalogue created is utilized for evaluating a new incident of interest. As discussed above, the catalogue may also be employed to generate a story of the incident of interest and/or the actionable event based on the received multi-modal inputs. This story may be presented to appropriated authorities during notification of actionable event. As will be appreciated, this helps in provided a more effective and efficient remedial response to the person in need of assistance. Alternatively, as discussed above, the actionable event itself may be in the form of a story.

Figure 9:
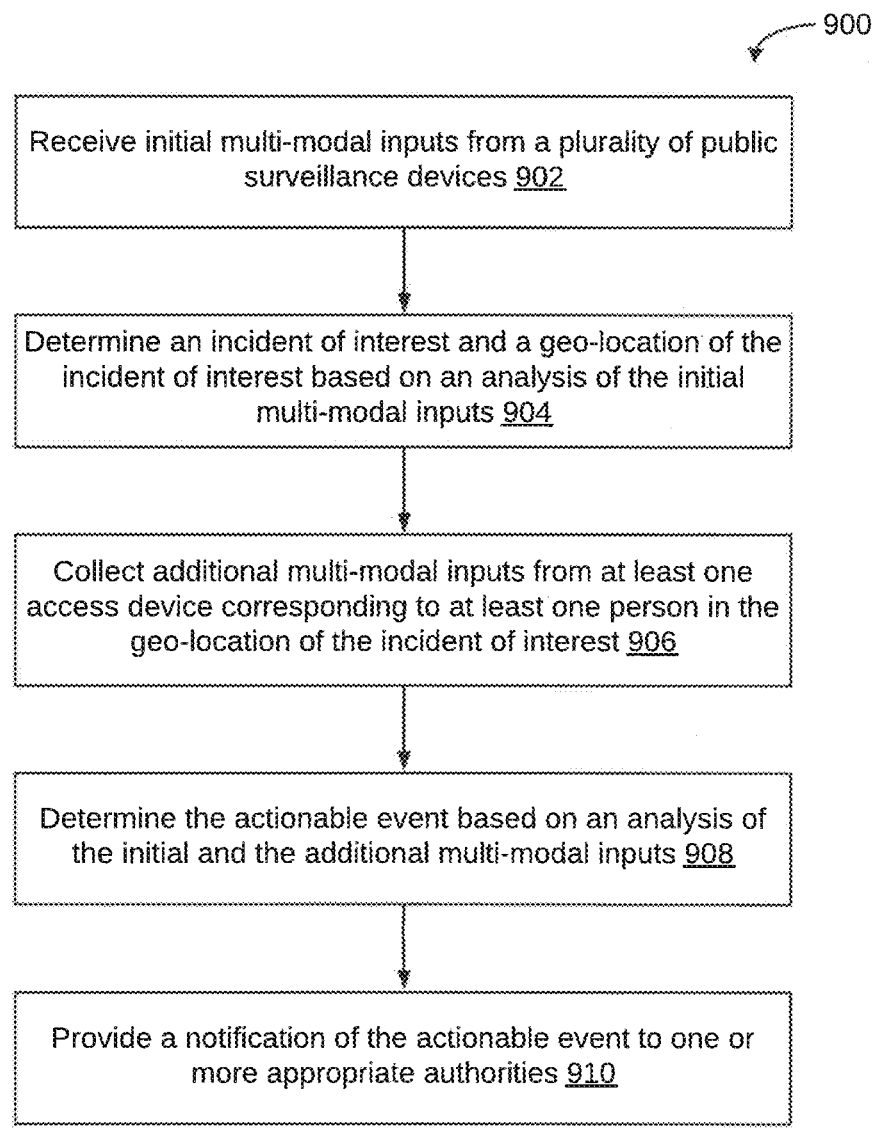
FIG. 9 is a flow diagram of an exemplary process for detecting and notifying actionable events during surveillance by public surveillance devices, in accordance with some embodiments of the present disclosure.

Referring now to FIG. 9, an exemplary control logic 900 for detecting and notifying actionable events during surveillance by public surveillance devices is depicted via a flowchart, in accordance with some embodiments of the present disclosure. At step 902, initial multi-modal inputs along with a geo-location, is received during surveillance by public surveillance devices. At step 904, based on analysis of the initial multi-modal inputs received, an incident of interest is determined. Once the incident of interest is determined, at step 906, additional multi-modal inputs is collected from at least one access device corresponding to at least one person in the geo-location upon determination of the incident of interest. At step 908, the initial and the additional multi-modal inputs are analyzed, in order to determine an actionable event. Thereafter, based on the actionable event determined, at step 910, a notification along with recommendation for the actionable event is provided to one or more appropriate authorities.

Figure 10:
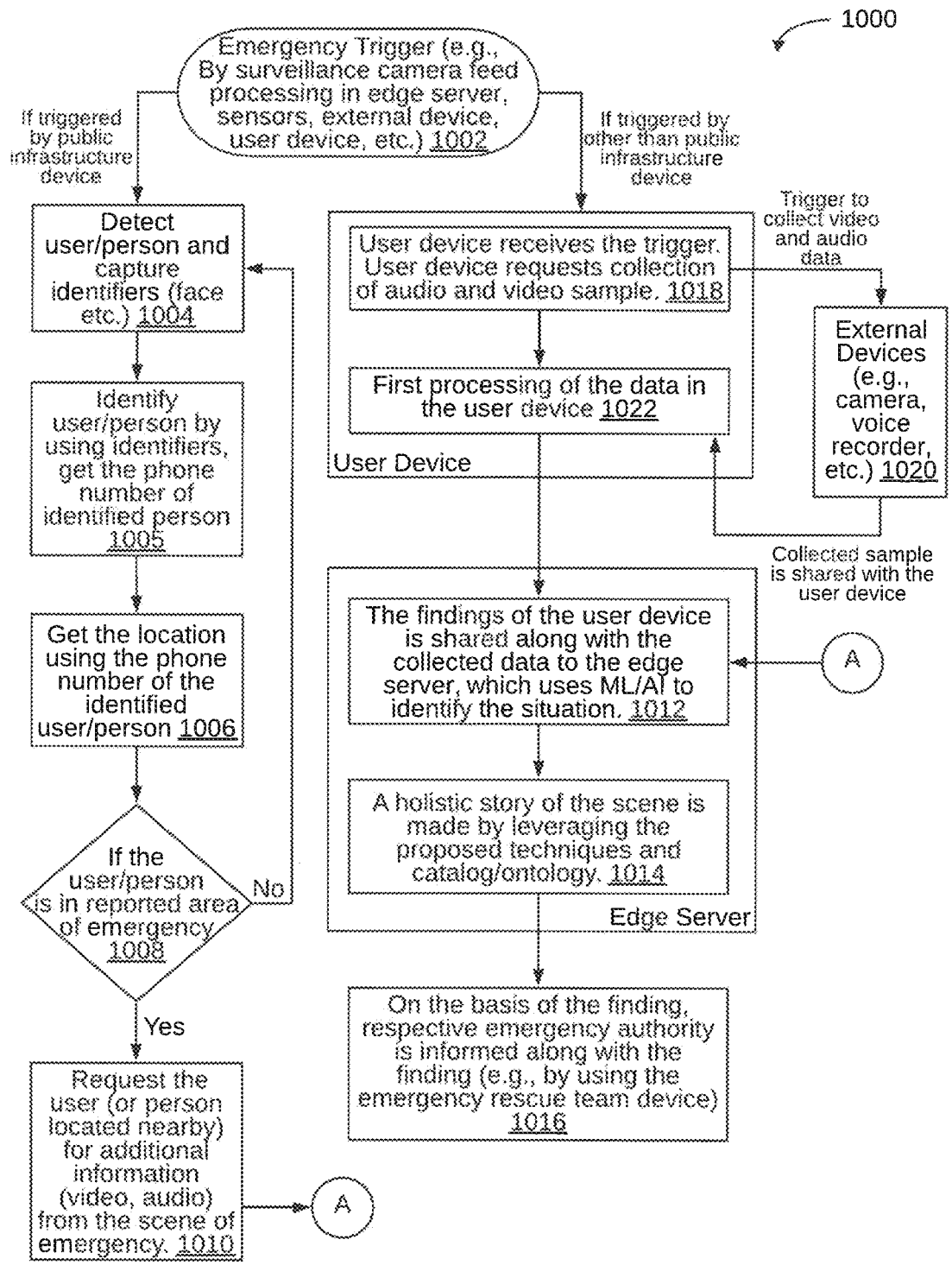
FIG. 10. is a flow diagram of a detailed exemplary process for detecting and notifying actionable events during surveillance, in accordance with some embodiments of the present disclosure.

Referring now to FIG. 10, exemplary control logic 1000 for detecting and notifying actionable events during surveillance is depicted in greater detail via a flowchart, in accordance with some embodiments of the present disclosure. At step 1002, initial multi-modal inputs may be received from a geo-location during surveillance from plurality of surveillance devices. By way of an example, initial multi-modal inputs may include, but are not limited to, speech, image, video, notification from device, and sensor reading from device. By way of another example, the surveillance devices 102 may include, but are not limited to, CCTV camera, IP camera, microphone, IoT sensor, mobile device, hand-held device, and wearable device. As stated above, the initial multi-modal inputs may come with or may include geo-location information of the reading. These received initial multi-modal inputs are further analyzed in order to identify an incident of interest. The incident of interest may include, but is not limited to, an accident, a crime, a rot, and a natural disaster. By way of an example, the initial multi-modal inputs may be a feed from public surveillance devices (e.g., CCTV cameras) showing a damaged stationary vehicle probably with injured passenger.

Further, at step 1004, a set of persons may be detected from the initial multi-modal inputs. A set of identifiers (e.g., face, voice, etc.) corresponding to each of the set of persons may be extracted from the initial multi-modal inputs. At step 1005, a set of persons may be identified in the geo-location of incident of interest based on the extracted identifiers. By way of example, in order to identify the set of persons, at least one of a facial recognition of a set of faces or a voice recognition of a set of voices may be performed. Additionally, the one or more mobile numbers corresponding to the at least one person from the set of identified persons may be retrieved. At step 1006, a geo-location may be retrieved for the one or more retrieved mobile numbers. Thereafter, at step 1008, the geo-location corresponding to the set of persons is verified with the geo-location of the public surveillance device providing the feed. It should be noted that, in some embodiments, the set of persons may be a single person with a verified geo-location (i.e., the location of the mobile device of the identified single person is in the geo-location of the incident of interest).

If the geo-location corresponding to the set of persons matches with the geo-location of the public surveillance devices, at step 1010, a request is made for collecting additional multi-modal inputs. As stated above, the additional multi-modal inputs may be collected by enabling an emergency application installed in at least one access device corresponding to at least one person in the geo location of incident of interest. Further, as stated above, the emergency application in the mobile device of the identified person may be triggered automatically or manually, in stealth mode or in non-stealth mode, with a notification or without a notification, upon permission or without permission. By way of an example, the additional multi-modal inputs may include, but are not limited to, voice of identified persons, video-recording of the surrounding, and monitored sensor parameters. Alternatively, if the geo-location corresponding to the set of persons does not match with the geo-location of the public surveillance devices, the process reiterates back to step 1004.

At step 1012, the initial and additional multi-modal inputs are analyzed for determining an actionable event, via machine learning or artificial intelligence. By way of an example, the actionable event may include, but is not limited to, an injured person in road accident, a person in endangered situation, and a fire emergency. At step 1014, a story is made based on the identified incident of interest and the determined actionable event. Thereafter, at step 1016, a notification about the actionable event is provided to one or more appropriate authorities. The notification may further be followed with a recommendation for the actionable event, to the one or more authorities. By way of an example, one or more authorities may include, but are not limited to, nearby police station, nearby hospital, and nearby fire station.

In an alternative embodiment, if the identified incident of interest is not received from public surveillance devices, then, at step 1018, a user device in possession of the user may be triggered via an external device or by a user. The user device may then initiate a trigger for collecting initial multi-modal inputs. By way of an example, the user device may include the emergency application discussed. The user device may include, but is not limited to, an access device 110, a fitness tracker, a tracking device, a specialized device. At step 1020, the user device may communicate with one or more external devices 112 for collecting additional multi-modal inputs. By way of an example, the external devices 112 may include, but are not limited to, camera, voice recorder, fitness tracker, and health monitoring system. Additionally, in some embodiments, the user device may note a timestamp at which a request is initiated to the external devices for collecting the additional multi-modal inputs, and a timestamp at which the user device receives the additional multi-modal inputs. The user device may also capture a geo-location information.

For example, in some embodiments, if the trigger is from blood sugar level sensor or blood pressure monitor, the user device may recognize and receive the metadata in order to identify and make sense of the shared data. It should be noted that the user device may receive a trigger when the blood sugar level drops beyond a pre-defined threshold or when blood pressure crosses pre-defined thresholds. In that case, the blood sugar level sensor and blood pressure monitor may continuously share sugar level and blood pressure level with the user device. Thereafter, at step 1020, a first processing of the initial multi-modal inputs and the additional multi-modal inputs may be performed by the user device. By way of an example, the user device may perform the first processing based on emergency application installed on the user device. The user device may then share the initial and the additional multi-modal inputs with the edge server 104 for further processing. The edge server 104, at step 1012, may then analyze the initial and additional multi-modal inputs for determining an actionable event, via machine learning or artificial intelligence. By way of an example, the actionable event may include, but is not limited to, a health emergency. At step 1014, a story is made based on the identified actionable event. Thereafter, at step 1016, a notification about the identified actionable event is provided to one or more appropriate authorities. The notification may further be followed with a recommendation for the actionable event about the actionable event, to one or more authorities. By way of an example, one or more authorities may include, but are not limited to, a health center or emergency response team.

By way of another example, an incident of interest may be coming from a handheld device. For example, a person riding a vehicle may experience sudden shock as detected by the handheld device. In such case, if the device ceases to move soon after, it's indication of a potential fall or an accident encountered by the person. Under such condition, the application resident on the handheld device, may trigger an emergency alarm either directly or via the communicatively coupled mobile device, subject to further check to eliminate false trigger.

By way of a further example, an incident of interest may be coming from a fitness tracking device. For example, a person running away from criminal may experience increased heart rate due to panic. In such case, if the heart rate reading crosses a certain pre-defined enhanced threshold (threshold greater than that experienced due to normal running) soon after, it's indication of a potential threat encountered by the person. Under such condition, the fitness tracking device may trigger an emergency application resident on the access device, which may trigger an emergency alarm, subject to further check to eliminate false trigger. In such case, the edge server may further validate threat by correlating a geo-location of the perceived threat with feed from a public CCTV camera in that geo-location.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 11:
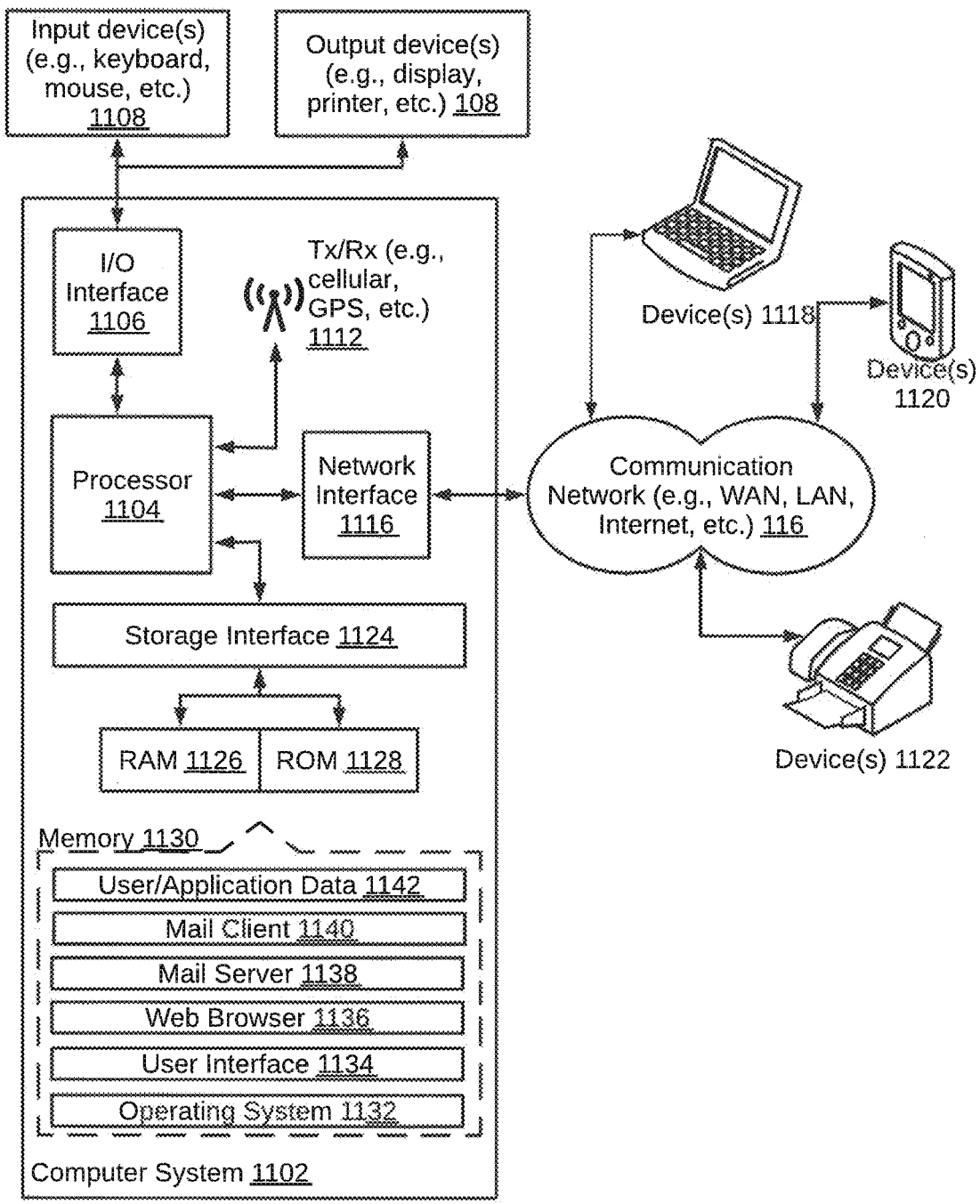
FIG. 11 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 11, a block diagram of an exemplary computer system 1102 for implementing various embodiments consistent with the present disclosure is illustrated. Computer system 1102 may include a central processing unit ("CPU" or "processor") 1104. Processor 1104 may include at least one data processor for executing program components for executing user or system-generated requests. A user may include a person, a person using a device such as such as those included in this disclosure, or such a device itself. Processor 1104 may include specialized processing units such as integrated system (bus) controllers, memory management control units, floating point units, graphics processing units, digital signal processing units, etc. Processor 1104 may include a microprocessor, such as AMD® ATHLON® microprocessor, DURON® microprocessor OR OPTERON® microprocessor ARM's application, embedded or secure processors, IBM® POWERPC®, INTEL'S CORE® processor, ITANIUM® processor, XEON® processor, CELERON® processor or other line of processors, etc. Processor 1104 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1104 may be disposed in communication with one or more input/output (I/O) devices via an I/O interface 1106. I/O interface 1106 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 1106, computer system 1102 may communicate with one or more I/O devices. For example, an input device 1108 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 1110 may be a printer, fax machine, video display (for example, cathode ray tube (CRT), liquid crystal display (LCD), light-emitting diode (LED), plasma, or the like), audio speaker, etc. In some embodiments, a transceiver 1112 may be disposed in connection with processor 1104. Transceiver 1112 may facilitate various types of wireless transmission or reception. For example, transceiver 1112 may include an antenna operatively connected to a transceiver chip (for example, TEXAS® INSTRUMENTS WILINK WL1286® transceiver, BROADCOM® BCM45501UB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 1104 may be disposed in communication with a communication network 1114 via a network interface 1116. Network interface 1116 may communicate with communication network 1114. Network interface 1116 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 1114 may include, without limitation, a direct interconnection, local area network (LAN), wide area network (WAN), wireless network (for example, using Wireless Application Protocol), the Internet, etc. Using network interface 1116 and communication network 1114, computer system 1102 may communicate with devices 1118, 1120, and 1122. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® e-reader, NOOK tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 1102 may itself embody one or more of these devices.

In some embodiments, processor 1104 may be disposed in communication with one or more memory devices (for example, RAM 1126, ROM 1128, etc.) via a storage interface 1124. Storage interface 1124 may connect to memory 1130 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1130 may store a collection of program or database components, including, without limitation, an operating system 1132, user interface application 1134, web browser 1136, mail server 1138, mail client 1140, user/application data 1142 (for example, any data variables or data records discussed in this disclosure), etc. Operating system 1132 may facilitate resource management and operation of computer system 1102. Examples of operating systems 1132 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 1134 may facilitate display, execution, interaction, manipulation, or operation of program components through textual or graphical facilities. For example, user interfaces may provide computer interaction interface elements on a display system operatively connected to computer system 1102, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2 platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 1102 may implement a web browser 1136 stored program component. Web browser 1136 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 1102 may implement a mail server 1138 stored program component. Mail server 1138 may be an Internet mail server such as MICROSOFT® EXCHANGE® mail server, or the like. Mail server 1138 may utilize facilities such as ASP, ActiveX, ANSI C++/C#, MICROSOFT .NET programming language, CGI scripts, JAVA® programming language, JAVASCRIPT programming language, PERL® programming language, PHP® programming language, PYTHON® programming language, WebObjects, etc. Mail server 1138 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1102 may implement a mail client 1140 stored program component. Mail client 1140 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 1102 may store user/application data 1142, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The techniques described in various embodiments discussed above provide for validated and actionable event that require remedial response. The techniques further provide for layered details of the situation by identifying a type and a severity of the situation, a condition of an individual in the situation, and so forth. As will be appreciated, such details help in providing appropriate and better remedial response. Thus, the techniques provide for 2 level of processing of information—a first level processing of initial multi-modal inputs and a second level processing of initial and additional multi-modal inputs. In some embodiments, the first level of processing may be performed at device level while the second level of processing may be performed at edge server. This reduces the latency and bandwidth requirement and increases computational efficiency at the edge server.

In some embodiments, the techniques provide for detection of any untoward activity by using public infrastructure as well as other personal devices. The techniques further provide for collection of additional information to form a story about any untoward activity. It should be noted that the techniques provide for emergency trigger and additional information collection in an automatic as well as semi-automatic way. This helps in handling aggravated emergency conditions in an effective and efficient manner. For example, the techniques may trigger alarm and capture additional details with respect to an endangered person without drawing attention of the aggravator.

The specification has described method and system for detecting and notifying actionable events during surveillance. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for detecting and notifying an actionable event during surveillance, the method comprising:
    receiving initial multi-modal inputs from a geo-location during surveillance;
    determining an incident of interest based on an analysis of the initial multi-modal inputs, wherein the determination of an incident of interest is based on:
        generating a confidence score for each of a plurality of incidents of interest determined over a period of time, wherein the confidence score is based on a criticality of the actionable event;
        creating a catalogue of the plurality of incidents of interest based on their respective confidence scores and actionable events, wherein the created catalogue is stored in form of a knowledge graph which is referred for decision making while evaluating an incident of interest from the plurality of incidents of interest; and
        utilizing the catalogue for evaluating a new incident of interest;
    collecting additional multi-modal inputs from at least one access device corresponding to at least one person in the geo-location upon determination of the incident of interest;
    determining the actionable event based on an analysis of the initial and the additional multi-modal inputs; and
    providing a notification of the actionable event to one or more appropriate authorities.

2. The method of claim 1, wherein receiving the initial multi-modal inputs comprises receiving the initial multi-modal inputs from one or more surveillance devices, wherein the one or more surveillance devices comprise at least one of a closed-circuit television (CCTV) camera, an Internet Protocol (IP) camera, a microphone, an Internet-of-Things (IoT) sensor, a mobile device, a hand-held device, or a wearable device; and wherein the at least one access device comprises a mobile device, a hand-held device, or a wearable device.

3. The method of claim 1, further comprising:
    identifying a set of persons in the geo-location upon determination of the incident of interest by performing at least one of a facial recognition of a set of faces or a voice recognition of a set of voices in the initial multi-modal inputs against a plurality of persons in a population register;
    determining a set of access devices corresponding to the set of persons from the population register; and
    activating the at least one access device from the set of access devices for collecting additional multi-modal inputs.

4. The method of claim 1, further comprising:
    determining a plurality of access devices in the geo-location upon determination of the incident of interest based on inputs from one or more network operators;
    identifying a plurality of persons corresponding to the plurality of access devices from a population register;
    identifying a set of persons by performing at least one of a facial recognition of a set of faces or a voice recognition of a set of voices in the multi-modal inputs against the plurality of persons in the population register; and activating the at least one access device corresponding to the at least one person from the set of persons for collecting additional multi-modal inputs.

5. The method of claim 1, wherein the at least one access device is activated for collecting additional multi-modal inputs upon at least one of: a notification to the at least one person, and a permission from the at least one person.

6. The method of claim 1, wherein determining the actionable event comprises correlating the initial and the additional multi-modal inputs so as to validate the incident of interest and gathering specific inputs with respect to the incident of interest.

7. The method of claim 1, further comprising providing one or more recommendations to the one or more appropriate authorities based on the actionable event.

8. A system for detecting and notifying an actionable event during surveillance, the system comprising:
  an edge server comprising a processor and a memory communicatively coupled to the processor, wherein the memory stores processor-executable instructions, which, on execution, causes the processor to:
    receive initial multi-modal inputs from a geo-location during surveillance;
    determine an incident of interest based on an analysis of the initial multi-modal inputs, wherein the determination of an incident of interest is based on:
      generating a confidence score for each of a plurality of incidents of interest determined over a period of time, wherein the confidence score is based on a criticality of the actionable event;
      creating a catalogue of the plurality of incidents of interest based on their respective confidence scores and actionable events, wherein the created catalogue is stored in form of a knowledge graph which is referred for decision making while evaluating an incident of interest from the plurality of incidents of interest; and
      utilizing the catalogue for evaluating a new incident of interest;
    collect additional multi-modal inputs from at least one access device corresponding to at least one person in the geo-location upon determination of the incident of interest;
    determine the actionable event based on an analysis of the initial and the additional multi-modal inputs; and
    provide a notification of the actionable event to one or more appropriate authorities.

9. The system of claim 8, further comprising one or more surveillance devices for acquiring the initial multi-modal inputs, wherein the processor receive initial multi-modal inputs from the one or more surveillance devices, and wherein the one or more surveillance devices comprise at least one of a closed-circuit television (CCTV) camera, an Internet Protocol (IP) camera, a microphone, an Internet-of-Things (IoT) sensor, a mobile device, a hand-held device, or a wearable device.

10. The system of claim 8, wherein the processor-executable instructions further cause the processor to:
  identify a set of persons in the geo-location upon determination of the incident of interest by performing at least one of a facial recognition of a set of faces or a voice recognition of a set of voices in the initial multi-modal inputs against a plurality of persons in a population register;
  determine a set of access devices corresponding to the set of persons from the population register; and
  activate the at least one access device from the set of access devices for collecting additional multi-modal inputs.

11. The system of claim 8, wherein the processor-executable instructions further cause the processor to:
  determine a plurality of access devices in the geo-location upon determination of the incident of interest based on inputs from one or more network operators;
  identify a plurality of persons corresponding to the plurality of access devices from a population register;
  identify a set of persons by performing at least one of a facial recognition of a set of faces or a voice recognition of a set of voices in the multi-modal inputs against the plurality of persons in the population register; and
  activate the at least one access device corresponding to the at least one person from the set of persons for collecting additional multi-modal inputs.

12. The system of claim 8, and wherein the at least one access device comprises a mobile device, a hand-held device, or a wearable device, and wherein the at least one access device is activated for collecting additional multi-modal inputs upon at least one of: a notification to the at least one person, and a permission from the at least one person.

13. The system of claim 8, wherein determining the actionable event comprises correlating the initial and the additional multi-modal inputs so as to validate the incident of interest and gathering specific inputs with respect to the incident of interest.

14. The system of claim 8, wherein the processor-executable instructions further cause the processor to:
  provide one or more recommendations to the one or more appropriate authorities based on the actionable event.

15. A non-transitory computer-readable medium storing computer-executable instructions for detecting and notifying an actionable event during surveillance that when executed by a processor, cause the processor to perform operations comprising:
  receiving initial multi-modal inputs from a geo-location during surveillance;
  determining an incident of interest based on an analysis of the initial multi-modal inputs, wherein the determination of an incident of interest is based on:
    generating a confidence score for each of a plurality of incidents of interest determined over a period of time, wherein the confidence score is based on a criticality of the actionable event;
    creating a catalogue of the plurality of incidents of interest based on their respective confidence scores and actionable events, wherein the created catalogue is stored in form of a knowledge graph which is referred for decision making while evaluating an incident of interest from the plurality of incidents of interest; and
    utilizing the catalogue for evaluating a new incident of interest;
  collecting additional multi-modal inputs from at least one access device corresponding to at least one person in the geo-location upon determination of the incident of interest;
  determining the actionable event based on an analysis of the initial and the additional multi-modal inputs; and
  providing a notification of the actionable event to one or more appropriate authorities.

16. The non-transitory computer-readable medium of claim 15, further storing computer-executable instructions for:

identifying a set of persons in the geo-location upon determination of the incident of interest by performing at least one of a facial recognition of a set of faces or a voice recognition of a set of voices in the initial multi-modal inputs against a plurality of persons in a population register;

determining a set of access devices corresponding to the set of persons from the population register; and activating the at least one access device from the set of access devices for collecting additional multi-modal inputs.

17. The non-transitory computer-readable medium of claim 15, further storing computer-executable instructions for:

determining a plurality of access devices in the geo-location upon determination of the incident of interest based on inputs from one or more network operators;

identifying a plurality of persons corresponding to the plurality of access devices from a population register;

identifying a set of persons by performing at least one of a facial recognition of a set of faces or a voice recognition of a set of voices in the multi-modal inputs against the plurality of persons in the population register; and activating the at least one access device corresponding to the at least one person from the set of persons for collecting additional multi-modal inputs.

18. The non-transitory computer-readable medium of claim 15, further storing computer-executable instructions for:

providing one or more recommendations to the one or more appropriate authorities based on the actionable event.

* * * * *